United States Patent [19]

Anderson

[11] 4,119,305

[45] Oct. 10, 1978

[54] VISE

[76] Inventor: Emory H. Anderson, 3953 Laguna Blanca Dr., Santa Barbara, Calif. 93110

[21] Appl. No.: 857,316

[22] Filed: Dec. 5, 1977

[51] Int. Cl.² .............................................. B25B 1/04
[52] U.S. Cl. ........................................ 269/71; 269/97; 269/238
[58] Field of Search ...................... 269/71, 77, 97–98, 269/238

[56] References Cited

U.S. PATENT DOCUMENTS

| 2,019,789 | 11/1935 | Mahannah | 269/71 |
| 2,486,142 | 10/1949 | Fong | 269/45 |
| 2,569,424 | 9/1951 | Mayhew et al. | 269/97 |

*Primary Examiner*—Robert C. Watson
*Attorney, Agent, or Firm*—Jack C. Munro

[57] ABSTRACT

A vise designed in particular to support a clamped device to facilitate the performing of precise and intricate operations upon the device in a wide variety of positions. The vise includes a plurality of interconnected members which permits the clamping jaw assembly of the vise to be pivotly moved about three separate intersecting axes providing for an infinite number of positions in respect to the vise housing. Each of the movements are controlled by a friction brake.

10 Claims, 7 Drawing Figures

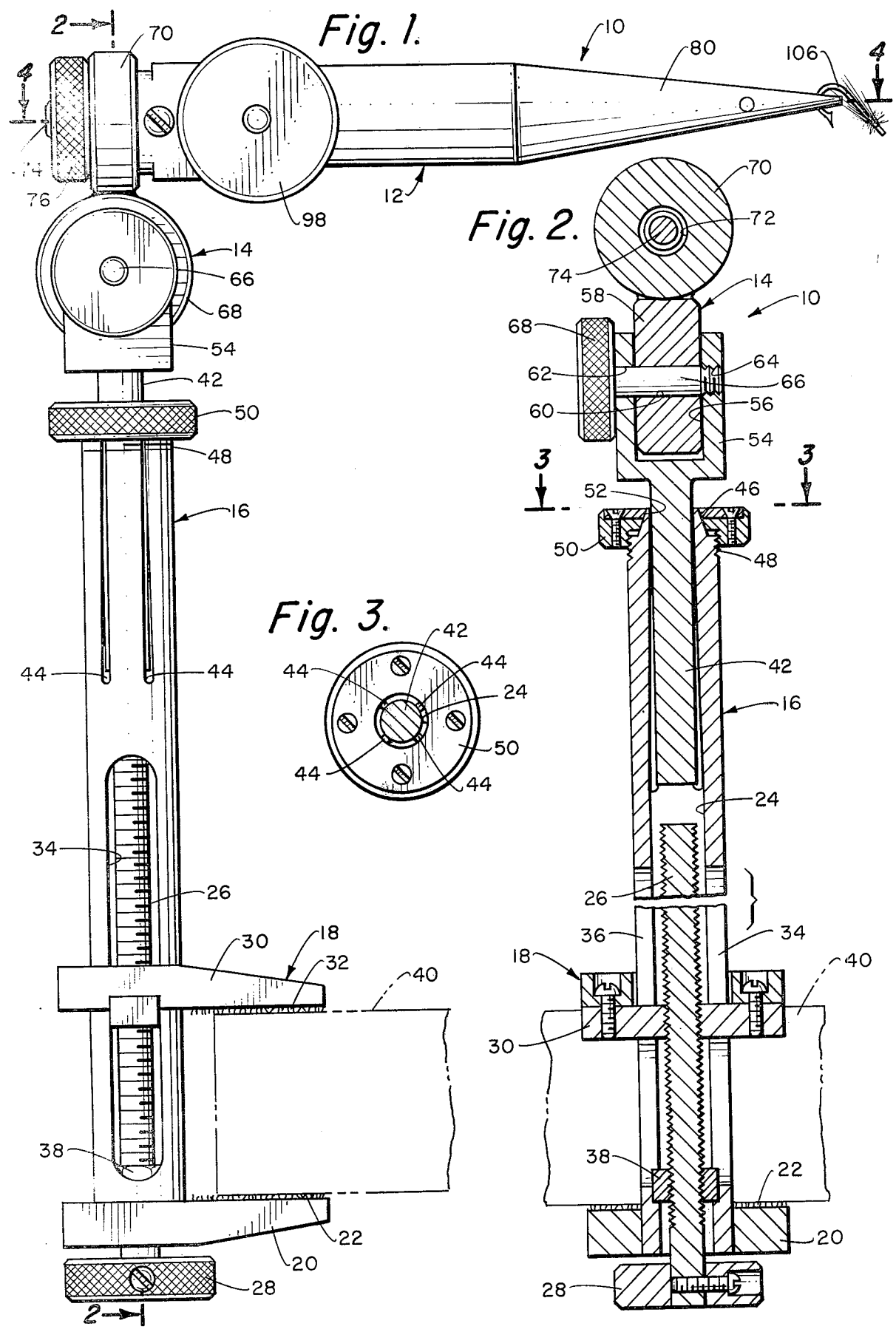

U.S. Patent  Oct. 10, 1978  Sheet 2 of 2  4,119,305
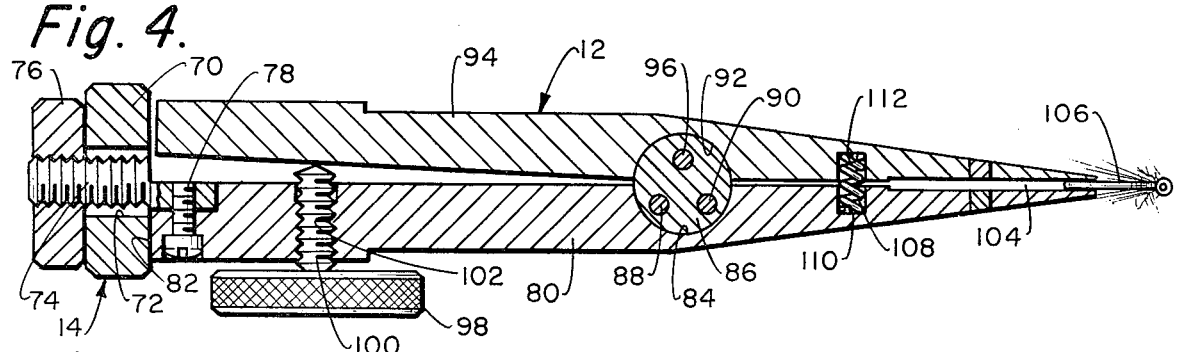
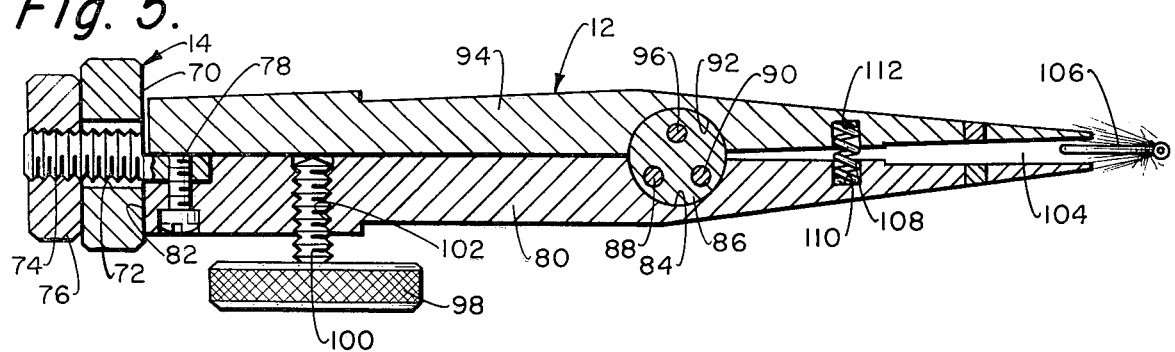
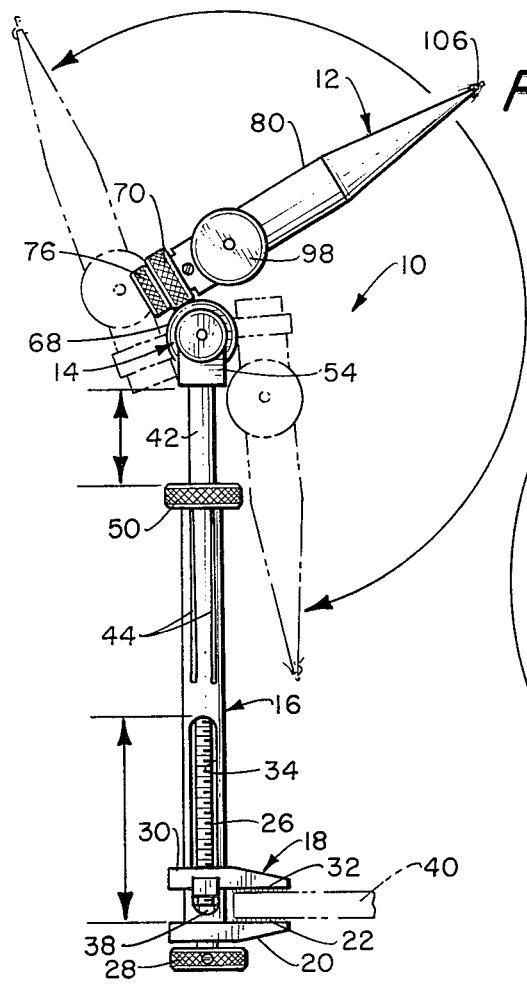
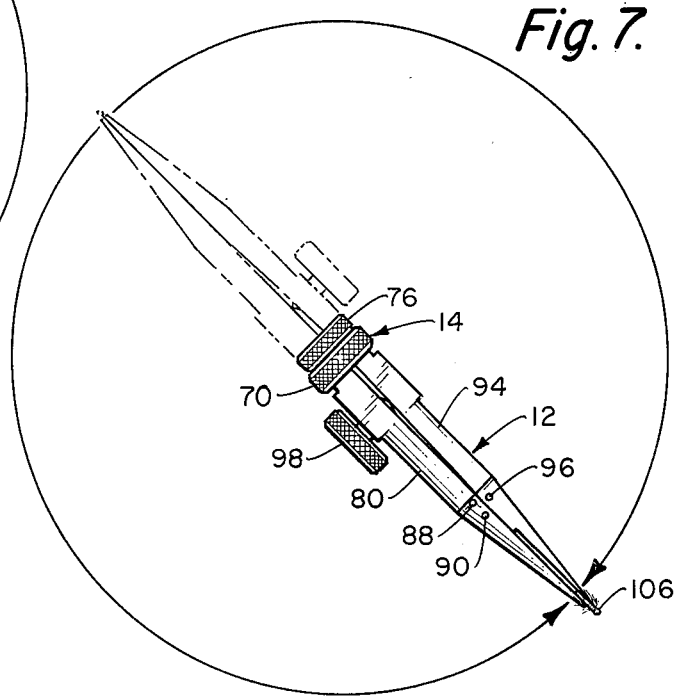

VISE

BACKGROUND OF THE INVENTION

The vise of the present invention was conceived for the primary purpose of tieing flies that are used in fly fishing. However, it is considered to be within the scope of this invention that the vise could be used in conjunction in any type of procedure which requires a wide degree of movement of the gripped item and/or the performing of intricate operations on the gripped item. Examples of other uses of the vise of this invention is in the field of micro-soddering of electronic components, precise welding of small sized items and in lapidary work.

In the tieing of flies, it is necessary that the fly be moved to a wide variety of different positions during the wrapping of the fly with the tinsel and string that is necessary to create the fly. It is normally necessary to precisely locate the wrapping upon the fish hook in the creating of the fly. An experienced fisherman will, upon encountering a particular type of fishing area, examine the different types of insects which are located within the fishing area. There are several thousand different types of varieties of insects and even a particular type of insect will vary in coloration and size between one fishing area and another. The experienced fisherman will make a serious attempt to precisely duplicate the insect at a particular fishing location. The using of such a fly greatly increases the chances of catching fish in that particular fishing location.

A vise of some type is usually desirable to be used to support the fish hook portion of the fly during the performing of the fly tieing operation. It is usually necessary to position the fish hook in a wide variety of positions during the few minutes that are required to tie the fly. Therefore, there is a definite need for some type of a vise which facilitates portability in use in remote areas, which can be readily attached to a wide variety of supporting structures and which can permit the fly to be moved to an endless number of positions to facilitate the tieing of a fly.

SUMMARY OF THE INVENTION

The vise of this invention includes a vise jaw assembly which is composed of a pair of vise jaws, one fixed and the other movable with respect to the fixed jaw to effect clamping onto an exterior object, such as a fish hook. The pivoting between jaws is accomplished about an axis located intermediate the length of the jaws and the movable jaw is spring biased to the open position. The fixed jaw is pivotly attached to a member which, in turn, is swively mounted to an elongated member. The elongated member is telescopingly connected to an elongated housing and is longitudinally adjustable in respect thereto. A pair of clamping members are mounted on the housing to facilitate securing of the device to an exterior structure. Each of the pivoting motions and the swiveling motion within the vise of this invention is frictionally braked so that when the device is moved to any particular position and released, the vise will automatically remain in the established position.

The primary objective of this invention is to contruct a vise which will tightly hold the grasped article and permit substantially unrestrictive movement of the article.

Another objective of this invention is to be readily able to visualize any side of the grasped article by moving of the grasped article to a given position. This obviates the need for any reflective mirrors, any changing of the clamping position or the use of any accessory tools such as magnifiers.

Another advantage of the vise of this invention that it is capable of being clamped onto any type of object, such as an irregular shaped fence post, or tree limb, a piece of glass, such as a car window, a pipe, the heel of one's shoe, or finely finished furniture.

Another objective of the vise of this invention is that it is capable of holding a wide variety of different sizes of articles.

Another objective of this invention is to construct a vise which is smooth in the adjusting movements.

BRIEF DESCRIPTION OF THE DRAWINGS

FIG. 1 is a side view of the vise of this invention depicting the vise being secured to a structure and grasping a fishing fly;

FIG. 2 is a cross sectional view of the vise of this invention taken along line 2—2 of FIG. 1;

FIG. 3 is a partial cross sectional view taken along line 3—3 of FIG. 2;

FIG. 4 is a cross sectional view of the vise jaw assembly employed within the vise of this invention taken along line 4—4 of FIG. 1 showing the vise jaw assembly in the closed position;

FIG. 5 is a view similar to FIG. 4 but showing the vise jaw asssembly in the open position;

FIG. 6 is a side diagrammatic view of the vise of this invention showing the movement of the vise jaw assembly to a plurality of different positions; and FIG. 7 is a plan diagrammatic view of the vise of this invention depicting the three hundred and sixty degree freedom of movement of the vise jaw assembly.

DETAILED DESCRIPTION OF THE SHOWN EMBODIMENT

It is to be reiterated that the vise of this invention can be used in any field of endeavor where it is necessary to accomplish close work upon a grasped structure. Examples of such fields are electronics, jewelers, photography, archeology and so forth. Actually, the potential use of the vise of this invention almost unlimited.

Most work holders of the prior art are designed to include the use of mirrors in order to examine the backside and underside of the grasped object. Within the vise of this invention the grasped article is merely moved to an observable location, such movement being accomplished quickly and easily. Therefore, there is no need for the use of any type of mirror.

The jaw assembly within the vise of this invention is shown to comprise a pair of thin elongated jaws. It is considered to be within the scope of this invention that practically any desirable shape of jaws could be employed, the jaws being possibly designed specifically for the particular field of use. In other words, in some fields of use the jaws may be wider at the grasping end and in others, or possibly the grasping surfaces of the jaws would be other than planar, such as some arcuate type of configuration.

It is also considered to be within the scope of this invention that the vise could be constructed of any type of rigid material. It may be desirable, in some instances, to make the vise jaws out of a magnetic material, any type of metallic material and alloys thereof, or potentially even wood and plastic.

Referring specifically to the drawings, there is shown the vise 10 of this invention which is composed generally of a grasping jaw assembly 12, a swivel assembly 14, a housing 16 and a clamp assembly 18.

The clamp assembly 18 includes a fixed clamping member 20 which is fixedly secured to one end of the housing 16. The clamping member 20 has a planar clamping surface which will normally be covered with a layer 22 of resilient material, such as felt, rubber or the like. The purpose of the material 22 is to prevent marring of certain types of surfaces.

The housing 16 includes an elongated hollow chamber 24. Extending into one end of the chamber 24 is a threaded rod 26. The rod 26 at its outer end thereof is attached to a knob 28. A clamping member 30, which is basically a mirror image duplicate of clamping member 20, is threadably secured to the rod 26. The clamping member 30 also includes on this grasping surface a layer 32 of material which is similar to the layer of material 22.

A portion of the clamping member 30 extends through elongated slots 34 and 36 formed within the housing 16. The side walls of the slots 34 and 36 function as a guide for the movement of the clamping member 30 so as to keep the clamping member 30 in alignment with the clamping member 20. A nut 38 is secured to the threaded rod 26 and, in essence, cooperates with the knob 28 to prevent significant longitudinal movement of the threaded rod 26 with respect to the housing 16.

It should be readily apparent that by rotation of the threaded rod 26 by manual turning of the knob 28 in either a counterclockwise or clockwise direction, the clamping member 30 will be moved longitudinally within the slots 34 and 36. The amount of movement is to be to the desires of the users so as to facilitate securing of the clamp assembly 18 to an exterior structure 40.

Telescopingly received within the housing 16 and in substantial alignment with the threaded rod 26 is a rod 42. The end of the housing 16 located about the rod 42 includes a series of slits 44. The upper end of the housing 16 which is located about the rod 42 includes a slight taper 46 adjacent a threaded section 48. A collar 50 is located about the tapered section 46 and threadably connects with the threaded section 48. The interior of the collar 50 includes a tapered surface 52. This tapered surface 52 is to connect with the tapered wall 46.

With the collar 50 being loosened upon the threaded section 48, the rod 42 is capable of longitudinal movement with respect to the housing 16. Once the desired longitudinal position of the rod 42 has been obtained, the operator is to merely tighten the collar 50 which meshes together the tapered surfaces 52 and 46. This causes the housing 16 to squeeze inwardly which is permitted by reason of the slots 44. This squeezing inwardly causes the housing 16 to bind against the rod 42 thereby fixing the rod 42 with respect to the housing 16. It is to be understood that the collar 50 can be sufficiently tightened to maintain the desired longitudinal extension of rod 42 in respect to housing 16 but at the same time permit rotative movement of rod 42 in respect to housing 16. Thereby, collar 50 functions as a friction brake.

The rod 42 is integrally connected to bifurcated section 54. The interior of the bifurcated section 54 forms a recess 56. Located within the recess 56 in a closely conforming manner is first disc member 58. Extending through the disc member 58 is a hole 60. The hole 60 is to be aligned with openings 62 and 64 formed within the spaced apart legs of the bifurcated section 54. The opening 64 is internally threaded and is to threadably connect with a rod 66. The rod 66 is secured to a knob 68.

With the knob 68 in a loose position, the disc shaped member 58 is capable of pivoting about the rod 66 within the recess 56. Upon tightening of the knob 68, the legs of the bifurcated section 54 are forced slightly together thereby creating a bind against the disc shaped member 58. This binding can be controlled by the tightening and loosening of the knob 68. This means that swivel arrangement can either function as a lock as a friction brake and most of the time the device functions as a friction brake.

A second disc shaped member 70 is integrally connected to the disc shaped member 58. The front plane of the member 70 is located at a right angle to the front plane of the member 58. Member 70 has a central aperture 72. Extending through the central aperture 72 is a threaded rod 74 which is threadably connected at its outer end thereof to a knob 76. The inner end of the threaded rod 74 is secured by fastener 78 to fixed jaw 80 of the jaw assembly 12. By tightening and loosening the knob 76, a binding occurs between inside surface of the knob 76 and the surface 82 of the fixed jaw 80. As a result, by the adjusting of the knob 76 a frictional brake therebetween is produced in the swiveling or pivoting motion of the fixed jaw 80 in respect to the disc member 70.

On the inner surface of the jaw 80 is a recess 84. Within the recess 84 there is located a cylindrical shaped pin 86. The pin 86 is secured to the jaw 80 by means of pivot pins 88 and 90.

The pin 86 is also located within a recess 92 of a movable jaw 94. A pin 96 connects the jaw 94 to the pin 86.

The shape of the movable jaw 94 is basically similar to the shape of the fixed jaw 80 with the mating surfaces of both of the jaws being substantially planar. The movable jaw 94 is to be moved by the manual rotation of knob 98 which is integrally connected to a threaded rod 100 which extends through a threaded opening 102 formed in the fixed jaw 80 and is in physical contact with the rear end of the movable jaw 94. The pivoting motion of the jaw 94 is accomplished about the pin 86. It is to be noted that the forward end of each of the jaws 80 and 94, from the pin 86 forward, is slanted a few degrees with respect to the rear surface of its respective jaw. This is for the purpose of forming a gap 104 to facilitate location of an object 106 to be gripped. A spring 108 is positioned within a recess 110 of the jaw 80 and also within a recess 112 of the jaw 94. The spring 108 functions to exert a constant bias tending to locate the movable jaw 94 in the open position, such as shown in FIG. 5 of the drawings.

Any object 106 which is gripped by the jaws 94 and 80 is movable to practically any position. The object 106 can be moved vertically in respect to the clasp member 40 by the longitudinal movement of the rod 42 in respect to the housing 16. The object 106 can also be pivoted three hundred and sixty degrees about a vertical axis created by the rod 42. The object 106 can also be moved about a horizontal axis created by the rod 66. The object 106 can also be moved about an axis passing through the threaded rod 74 which coincides with the longitudinal center axis of the jaw assembly 12. In other words, the object 106 can be quickly and easily located in practically any position to facilitate the performing of operations on the object 106.

What is claimed is:

1. A vise comprising:
   a housing;
   clamping means connected to one end of said housing for releasably securing said housing to an exterior supporting structure;
   swivel means connected to the free end of said housing, said swivel means being pivotable about a first axis, said swivel means including a first member and a second member, said second member being pivotable in respect to said first member about a second axis, said second axis being perpendicular to said first axis;
   second lock means for fixing said first member in respect to said second member, said second lock means also functioning as a frictional brake in the movement of said second member in respect to said first member;
   a vise jaw assembly mounted upon said second member and pivotable in respect thereto about a third axis, said third axis being perpendicular to both said first axis and said second axis, third lock means for fixedly positioning said vise jaw assembly relative to said second member, said third lock means being further capable of being employed as a friction brake, said vise jaw assembly including a clamping section for grasping onto an exterior device and support such thereby facilitating the performing of precise operations upon said device, said clamping section being located directly adjacent said third axis.

2. The vise as defined in claim 1 wherein:
   said housing comprising a pair of telescoped members with said first member being fixedly secured to one of said telescoped members, said telescoped members being longitudinally adjustable in respect to each other, said telescoped members being rotatable with respect to each other thereby creating said first axis; and
   first lock means for fixedly positioning said telescoped members at a desired longitudinal extension, by proper manual adjustment of said first lock means the said first lock means permits rotational movement between said telescoped members thereby functioning as a friction brake.

3. The vise as defined in claim 1 wherein said clamping means comprises:
   a fixed clamping member, a movable clamping member, said movable clamping member being movable toward and away from said fixed clamping member, said movable clamping member being connected to an elongated threaded rod, upon rotation of said threaded rod the said movable clamping member is moved toward and away from said fixed clamping member, said threaded rod being attached to an enlarged member for facilitating manual rotation of said threaded rod, said enlarged member being located directly adjacent said fixed clamping member and maintains a constant spacing in relation thereto.

4. The vise as defined in claim 1 wherein:
   said first axis intersects both said second axis and said third axis.

5. The vise as defined in claim 1 wherein said vise jaw assembly comprises:
   a fixed jaw and a movable jaw, said fixed jaw and said movable jaw being pivotally connected together intermediate the ends thereof, said movable jaw and said fixed jaw being capable of being located in a clamping position and an open position, biasing means connected between said fixed jaw and said movable jaw exerting a continuous bias upon said jaws to locate such in said open position, screws threading means to move said movable jaw to said clamping position.

6. The vise as defined in claim 2 wherein said clamping means comprises:
   a fixed clamping member, a movable clamping member, said movable clamping member being movable toward and away from said fixed clamping member, said movable clamping member being connected to an elongated threaded rod, upon rotation of said threaded rod the said movable, clamping member is moved toward and away from said fixed clamping member, said threaded rod being attached to an enlarged member for facilitating manual rotation of said threaded rod, said enlarged member being located directly adjacent said fixed clamping member and maintains a constant spacing in relation thereto.

7. The vise as defined in claim 6 wherein:
   said first axis intersects both said second axis and said third axis.

8. The vise as defined in claim 7 wherein said vise jaw assembly comprises:
   a fixed jaw and a movable jaw, said fixed jaw and said movable jaw being pivotally connected together intermediate the ends thereof, said movable jaw and said fixed jaw being capable of being located in a clamping position and an open position, biasing means connected between said fixed jaw and said movable jaw exerting a continuous bias upon said jaws to locate such in said open position, screw threading means to move said movable jaw to said clamping position.

9. The device as defined in claim 5 wherein:
   said fixed jaw and said movable jaw having abuttable surfaces on either side of said pivotal connection located intermediate the ends of said jaws, the portion of the abuttable surface for each said jaw located in the area of said clamping section being inclined with respect to the portion of said abuttable surface located directly adjacent said second member.

10. The device as defined in claim 8 wherein:
    said fixed jaw and said movable jaw having abuttable surfaces on either side of said pivotal connection located intermediate the ends of said jaws, the portion of the abuttable surface for each said jaw located in the area of said clamping section being inclined with respect to the portion of said abuttable surface located directly adjacent said second member.

* * * * *